US011983542B2

(12) United States Patent
Graff

(10) Patent No.: US 11,983,542 B2
(45) Date of Patent: May 14, 2024

(54) MANAGEMENT OF EDGE COMPUTING NODES IN PREBOOT EXECUTION ENVIRONMENT (PXE) HAVING UNIQUE MEDIA ACCESS CONTROL (MAC) ADDRESS WITH TARGETED INSTALLATION OF EDGE NODE

(71) Applicant: Pratexo, Inc., Austin, TX (US)

(72) Inventor: Petter Graff, Austin, TX (US)

(73) Assignee: Pratexo, Inc., Austin, TX (US)

( * ) Notice: Subject to any disclaimer, the term of this patent is extended or adjusted under 35 U.S.C. 154(b) by 70 days.

(21) Appl. No.: 18/056,309

(22) Filed: Nov. 17, 2022

(65) Prior Publication Data

US 2023/0161601 A1    May 25, 2023

Related U.S. Application Data

(60) Provisional application No. 63/281,091, filed on Nov. 19, 2021.

(51) Int. Cl.
  *G06F 9/4401* (2018.01)
  *G06F 3/04886* (2022.01)
(52) U.S. Cl.
  CPC ........ *G06F 9/4416* (2013.01); *G06F 3/04886* (2013.01); *G06F 9/4405* (2013.01)
(58) Field of Classification Search
  CPC ... G06F 9/4416; G06F 3/04886; G06F 9/4405
  See application file for complete search history.

(56) References Cited

U.S. PATENT DOCUMENTS

| 9,391,801 | B2 | 7/2016 | Raghu |
| 9,537,949 | B2* | 1/2017 | Husain ..................... H04L 67/34 |
| 9,654,599 | B1* | 5/2017 | Wheeler ............... G06F 9/4416 |
| 11,381,594 | B2 | 7/2022 | Koral et al. |
| 11,711,267 | B2 | 7/2023 | Parker et al. |
| 11,736,942 | B2 | 8/2023 | Bachmutsky et al. |
| 11,762,644 | B2* | 9/2023 | Tav ....................... G06F 9/4406 713/2 |
| 11,824,784 | B2 | 11/2023 | Keating et al. |

(Continued)

FOREIGN PATENT DOCUMENTS

| EP | 3968675 A1 | 3/2022 |
| EP | 3974994 A1 | 3/2022 |

*Primary Examiner* — Tammara R Peyton
(74) *Attorney, Agent, or Firm* — Jason C. Cameron

(57) ABSTRACT

A system and method for facilitating management of edge computing nodes of an edge computing network is disclosed is disclosed. The method includes registering one or more second edge nodes with an edge computing network, reading a MAC address of a network card associated with the one or more second edge nodes, and obtaining installation topic and the MAC address. Also, the method includes publishing a message on the installation topic associated with one or more parameters, performing one or more operations on the set of first edge nodes based on the installation topic, and executing the set of install instructions on the one or more second edge nodes. Further, the method includes publishing a result of the execution of the set of install instructions on the installation topic and the MAC address and updating a state of the edge computing network.

18 Claims, 5 Drawing Sheets

(56) References Cited

U.S. PATENT DOCUMENTS

| | | | |
|---|---|---|---|
| 2010/0174810 A1* | 7/2010 | Cain | G06F 9/4416 709/222 |
| 2021/0097449 A1 | 4/2021 | Chattopadhyay et al. | |
| 2022/0292960 A1 | 9/2022 | McEnroe et al. | |

* cited by examiner

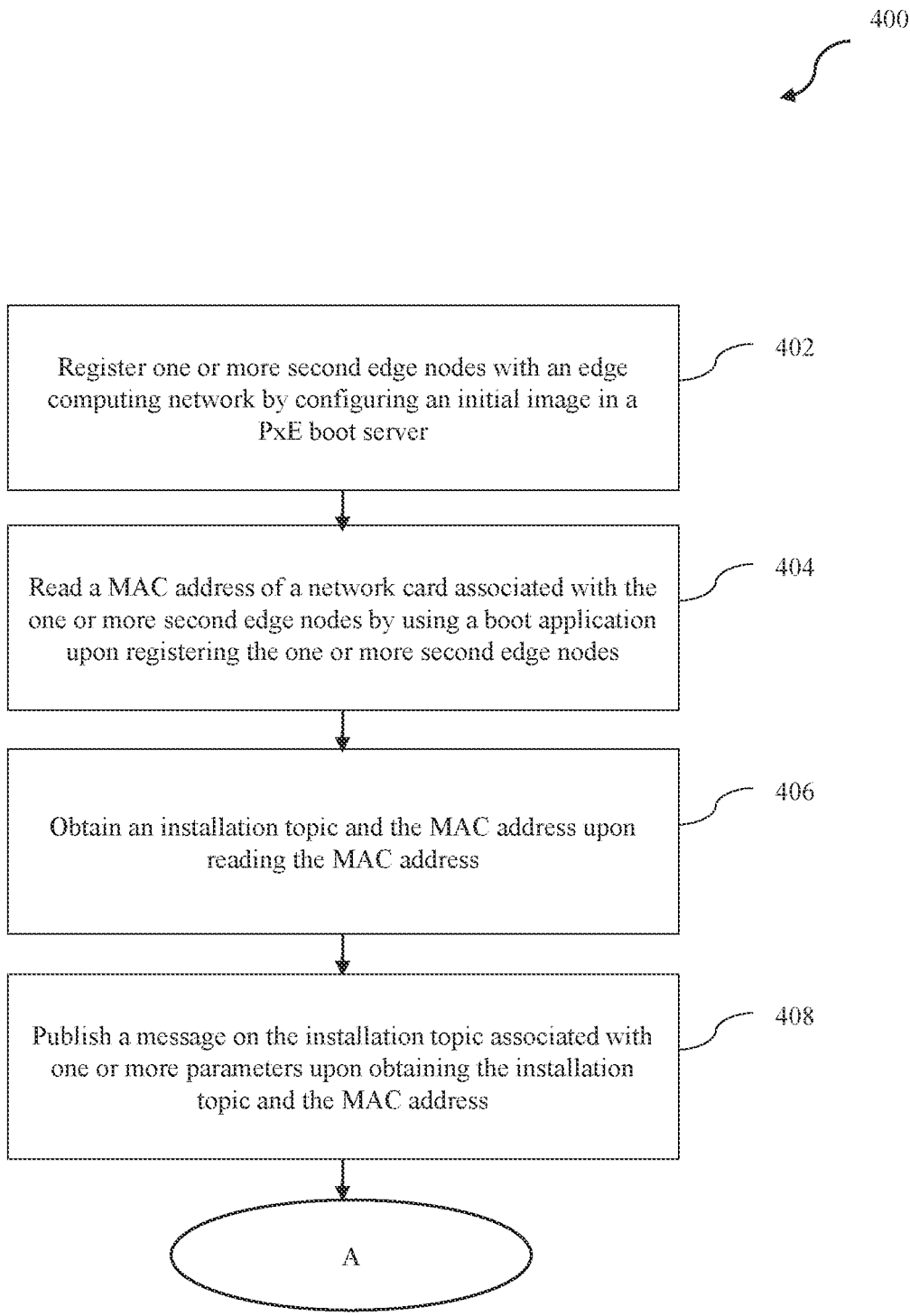
FIG. 4 (contd)

MANAGEMENT OF EDGE COMPUTING NODES IN PREBOOT EXECUTION ENVIRONMENT (PXE) HAVING UNIQUE MEDIA ACCESS CONTROL (MAC) ADDRESS WITH TARGETED INSTALLATION OF EDGE NODE

EARLIEST PRIORITY DATE

This application claims priority from a provisional patent application filed in the US having Patent Application No. 63/281,091, filed on Nov. 19, 2021 and titled "SYSTEM AND METHOD FOR SWARM INSTALLER".

FIELD OF INVENTION

Embodiments of the present disclosure relate to edge computing systems, and more particularly relates to a system and method for facilitating management of edge computing nodes of an edge computing network.

BACKGROUND

Typically, in any edge computing networks, when a new edge node is required to be configured, on a central location, a server should ensure that the new edge node executes all steps. The steps are defined by role of the new edge node, physical location of the new edge node and other contextual parameters of the new edge node. Centrally controlled software, such as Preboot Execution Environment (PxE) boot server and installation scripts such as Ansible, can solve execution of all the steps. However, there are a few use cases where the centrally controlled software cannot be used. Sometimes, the PxE boot server may not work. The centrally controlled software may not discover introduction of the new edge nodes. In the process of central initiation, an installation tool which are currently in use require installation process to be started at some central location. However, the exception includes use of the PxE boot protocol where the new edge nodes may initiate contact using the PxE boot server. An interface may be included where an install coordinator starts a process centrally. However, this introduces an extra step which requires training and time and an external Application Programming Interface (API) listed as a possible security vulnerability. Additionally, a connection is included from the install coordinator's devices to centrally controlled installation. However, such connection may not be possible as some of clients do not allow access to public network. During the configuration of central points of handshakes, networks at a customer site requires some configuration of the new edge nodes to ensure that the new edge nodes connect to a correct access point on a network to begin an installation process. This is done by configuring initial edge node in the PxE boot accessible network to access the PxE boot server, however not all the clients are allowed to connect to the PxE boot server. Even if connection between the client and the PxE server is possible, the use of a central PxE server may be a challenge in cases where a network connection is either fragile or slow. Prior to installation of the initial software, another challenge is typical for networks with edge clients. To configure the installed software, the edge nodes must agree upon how to collaborate. For example, when configuring the Kubernetes cluster MicroKuberntes (MK8). In order to join the MK8 cluster, the first step is to run a command on one of the already configured edge nodes currently running in the MK8 cluster to inform the cluster of the new edge node to join. The command produces an output which the system wants to parse to populate another command such as a join command. If the new edge node which joins performs on its own, the system has to Secure Socket Shell (SSH) into a participant node and run the command, parse the output to correctly issue the join command. The second step is to execute the command which is scraped on the new edge node from the first step. However, this process is error prone and requires the new edge nodes which has already configured with another node to connect and how to SSH into the node's username, password and Internet Protocol (IP). This introduces security vulnerabilities and other complexities.

Hence, there is a need for an improved system and method for facilitating management of edge computing nodes of an edge computing network, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computing system for facilitating management of edge computing nodes of an edge computing network is disclosed. The computing system includes one or more hardware processors and a memory coupled to the one or more hardware processors. The memory includes a plurality of modules in the form of programmable instructions executable by the one or more hardware processors. The plurality of modules include a node registration module configured to register one or more second edge nodes with an edge computing network by configuring an initial image in a PxE boot server. The edge computing network comprises a set of first edge nodes installed with the edge computing network. The one or more second edge nodes are new edge nodes which are not registered with the edge computing network. The set of first edge nodes are edge nodes which are already registered with the edge computing network. The plurality of modules also include a boot programming module configured to read a Media Access Control (MAC) address of a network card associated with the one or more second edge nodes by using a boot application upon registering the one or more second edge nodes. Further, the boot programming module is configured to obtain installation topic and the MAC address upon reading the MAC address. The installation topic includes install and join. The boot programming module is configured to publish a message on the installation topic associated with one or more parameters upon obtaining the installation topic and the MAC address. The plurality of modules also include an installation management module configured to perform one or more operations on the set of first edge nodes based on the installation topic for publishing a set of install instructions on the obtained installation topic and the obtained MAC address upon publishing the message. Furthermore, the plurality of modules also include a data execution module configured to execute the set of install instructions on the one or more second edge nodes upon performing the one or more operations. The data execution module configured to publish a result of the execution of the set of install instructions on the installation topic and the MAC address. The result of the execution is logged centrally. The plurality of modules include state updating module configured to update a state of the edge computing network upon publication of the result of the execution. Updating the state of edge computing network include one of: replacing one or more first edge nodes of the edge computing network with the one or more second edge nodes, removing the one or more first edge nodes of the edge computing network and adding the one or more second edge nodes to the edge computing network.

In accordance with another embodiment of the present disclosure, a method for facilitating management of edge computing nodes of an edge computing network is disclosed. The method includes registering one or more second edge nodes with an edge computing network by configuring an initial image in a PxE boot server. The edge computing network includes a set of first edge nodes installed with the edge computing network. The one or more second edge nodes are new edge nodes which are not registered with the edge computing network. The set of first edge nodes are edge nodes which are already registered with the edge computing network. The method further includes reading a Media Access Control (MAC) address of a network card associated with the one or more second edge nodes by using a boot application upon registering the one or more second edge nodes. Further, the method includes obtaining installation topic and the MAC address upon reading the MAC address. The installation topic includes install and join. Also, the method includes publishing a message on the installation topic associated with one or more parameters upon obtaining the installation topic and the MAC address. Furthermore, the method includes performing one or more operations on the set of first edge nodes based on the installation topic for publishing a set of install instructions on the obtained installation topic and the obtained MAC address upon publishing the message. The method also includes executing the set of install instructions on the one or more second edge nodes upon performing the one or more operations. Further, the method includes publishing a result of the execution of the set of install instructions on the installation topic and the MAC address. The result of the execution is logged centrally. The method includes updating a state of the edge computing network upon publication of the result of the execution. Updating the state of edge computing network include one of: replacing one or more first edge nodes of the edge computing network with the one or more second edge nodes, removing the one or more first edge nodes of the edge computing network and adding the one or more second edge nodes to the edge computing network.

Embodiment of the present disclosure also provide a non-transitory computer-readable storage medium having instructions stored therein that, when executed by a hardware processor, cause the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
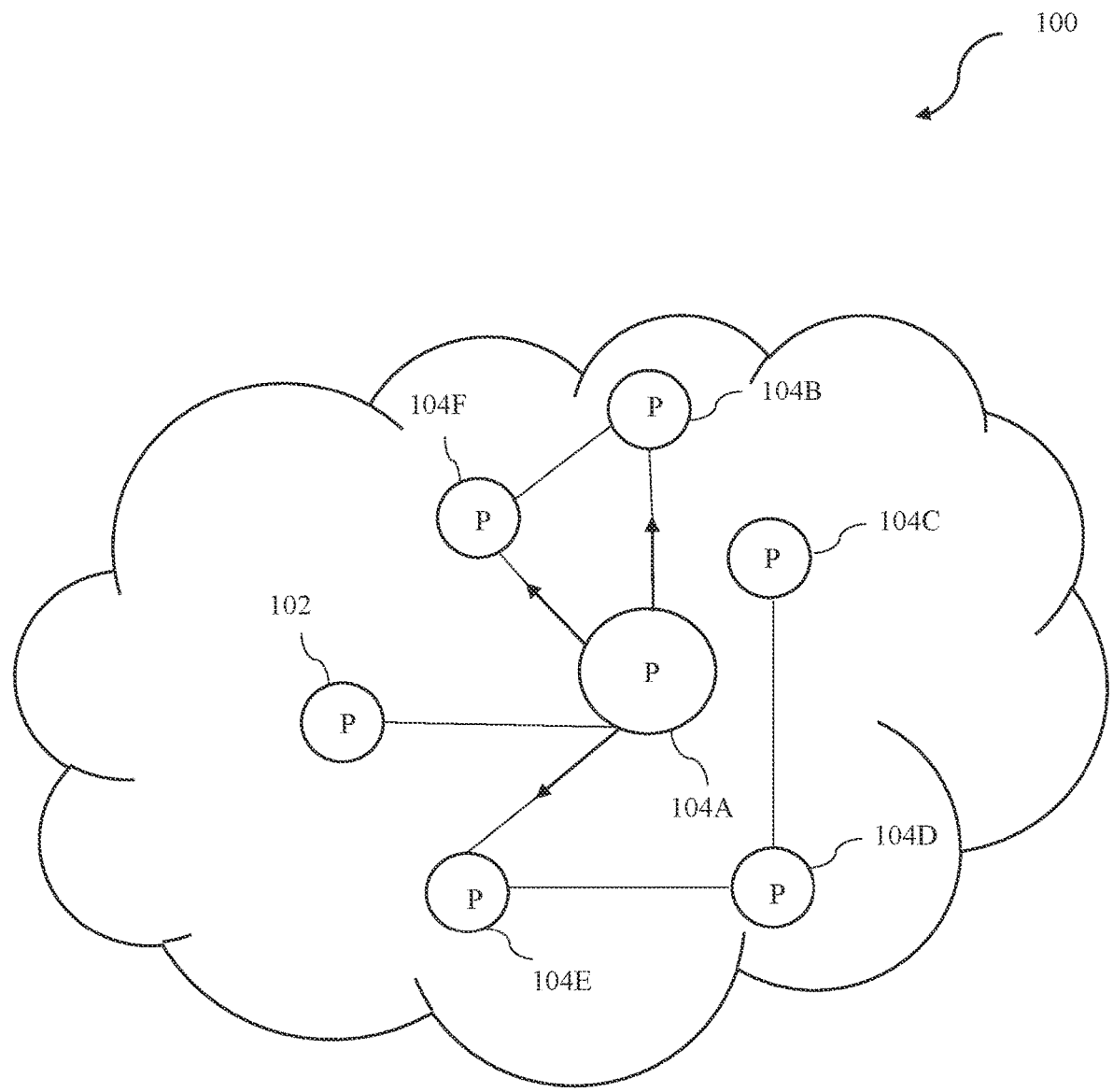
FIG. 1 is a block diagram illustrating an exemplary edge computing network depicting overall process of installation, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 is a block diagram illustrating an exemplary edge computing network depicting overall process of installation, in accordance with an embodiment of the present disclosure. In an embodiment of the present disclosure, a service technician connects a second edge node 102 to the edge computing network and the second edge node 102 learns its role in a set of first edge nodes 104 A, 104B, 104C . . . 104-F. For the sake of the present disclosure, the set of first edge nodes 104 A, 104B, 104C . . . 104-F have been represented as the set of first edge nodes 104. As used herein, the term 'edge node' is a computer that acts as an end user portal for communication with other nodes in Bluster computing. For example, the edge node is a gateway node or edge communication node. In an embodiment of the present disclosure, the second edge node 102 is a new edge node which is not registered with the edge computing network. The set of first edge nodes 104 are edge nodes which are already registered with the edge computing network. Although the explanation of FIG. 1 is limited to a single second edge node 102, it should be understood by the person skilled in the art that there can be more than one second edge node 102. In an embodiment of the present disclosure, the set of first edge nodes 104 can be replaced if there is an occurrence of failures. The edge computing network includes an installation process as simple as disconnecting broken node and replacing it with the second edge node 102. The installation process includes a preparation stage, a new installation stage, and a replacement installation stage. The preparation stage is performed prior to the installation stage. The preparation stage includes registration of a Media Access Control (MAC) address of the second edge node 102 which is shipped as a valid edge node and is dedicated to a site. In an embodiment of the present disclosure, it is not possible to dedicate the MAC address to the site. In such cases, a site identifier is included. For example, the site identifier, such as a Quick Response (QR) code at the site is included and Global Positioning System (GPS) can be included at the site, if the GPS is available. Further in such cases, an install coordinator is prompted to scan or enter the site identifier when the second edge node 102 joins an installation duster of the set of first edge nodes 104. In an embodiment of the present disclosure, the install coordinator may be a plugin, an API or a patch.

Further, the new installation stage includes adding the second edge node 102 to a known site for the first time. The new installation stage includes the install coordinator which connects the second edge node 102 to an intranet. The install coordinator introduces a user device and waits for the user device to be registered. In an exemplary embodiment, the user device may be a mobile phone. Meanwhile, the user device connects to the edge computing network and installs software using the process described below. If site information is required from the install coordinator, the install coordinator may have to enter the site ID or scan some code for the site as part of the waiting process. Alternatively, a green light is included on the second edge node 102 if the install coordinator does not have an access path to the user device. For example, the second edge node 102 cannot be connected using Bluetooth low energy (BLE), the second edge node 102 has no access to the intranet, the second edge node 102 has no path from the user device to some public notification service such as Twillo and the like. The user device is now running as registered device with the edge computing network and the install coordinator can leave the site.

Furthermore, the replacement installation stage includes either an edge node upgrade or edge node replacement due to failure. The install coordinator shutdowns and removes the existing user device. The install coordinator inserts a new user device into the edge computing network and powers up the new user device. From this point, the process is same as above and for some new user devices with exception of the new user device restoring all state information of the old user device. For example, a directory in a software-defined, parallel network file system is hooked up which is backed up, some restoration process is run in case data is corrupted.

In an embodiment of the present disclosure, the edge computing network uses Zenoh framework which simplifies construction of applications based on swarming. The Zenoh framework includes a set of concepts, such as Ad-Hoc connections, topics, queryable and the like. The Ad-Hoc connections allow communication between users on the same edge computing network if the uses share concept related to a topic. The Ad-Hoc connections also include securities. The topic defines a named channel of communication. The topic is similar to the topics in messaging systems, except the user has to be connected at the time of communication to see messages posted on the topic. In an embodiment of the present disclosure, no brokers are included and hence, the user is required to listen when messages are published. The queryable is a type of topic where a user may request information on something that has happened in the past or some data accumulated. If other user knows the information related to the topic the user has asked for, the other user can respond. For example, if a user joins the edge computing network expressing interest in the topic. From the time the user has joined till the time the user has disconnected, the user can see messages based on the topic the user is interested. The user may need to catch up on anything related to the topic. If the user defines a query related to the topic, the user may ask information about the state. If a queryable has to be implemented, the queryable will be able to answer the user. When a message is published, the user may see the message and the user can publish the message to one or more topics if the user is interested. In another example includes some vehicles collaborating on a traffic pattern over some road segment. The interested topic can be called as MYROAD. When a person driving the car starts driving a road segment and subscribes to MYROAD to communicate with other vehicles on the same road. A chat group or a channel in slack can be equated. During or before the person subscribes to MYROAD, the person may want to know about the latest news on MYROAD. Once the subscription is supported then a query is allowed to be defined. Any person can implement the queryable such as another vehicle, a 5G station along the road which keeps track of latest messages or state of the road. The person can start by asking a query such as WHAT'S HAPPENING ON MY ROAD.

Figure 2:
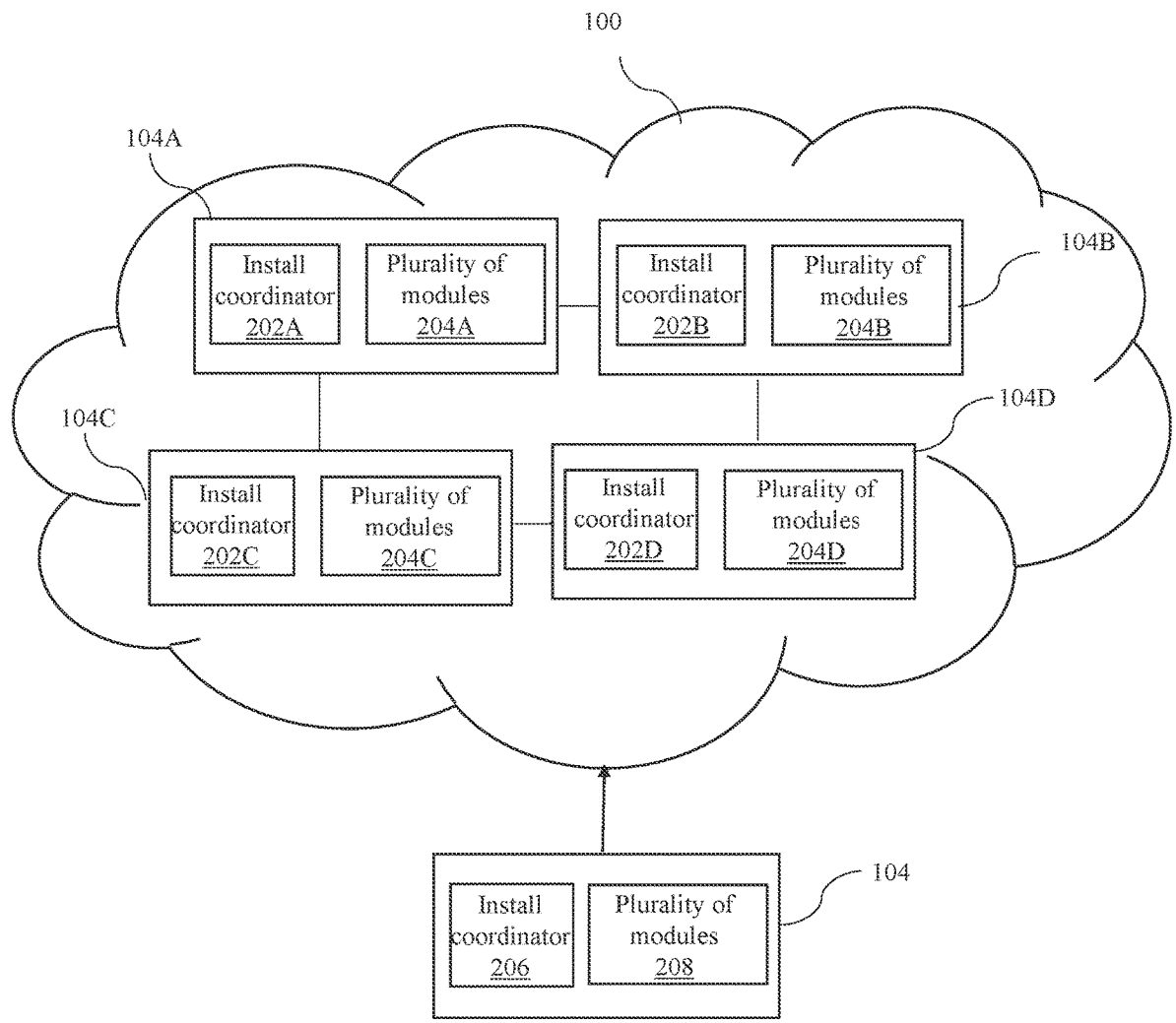
FIG. 2 is a block diagram illustrating the exemplary edge computing network with a second edge node, in accordance with an embodiment of the present disclosure.

FIG. 2 is a block diagram illustrating the exemplary edge computing network with a second edge node 102, in accordance with an embodiment of the present disclosure. The edge computing network includes the set of first edge nodes 104A, 104B, 104 C, and 104D which are already installed. For the sake of the present disclosure, the set of first edge nodes 104A, 104B, 104C, and 104D have been represented as the set of first edge nodes 104. The set of first edge nodes 104 includes an install coordinator 202A, 202B, 202C, and 202D and a plurality of modules 204A, 204B, 204C, and 204D implemented on a computing system. For the sake of the present disclosure, the install coordinator 202A, 202B, 202C, and 202D of each of the set of first edge nodes 104 have been represented as the install coordinator 202 and the plurality of modules 204A, 204B, 204C, and 204D of each of the set of first edge nodes 104 have been represented as the plurality of modules 204. Details on the plurality of modules and the computing system have been elaborated in FIG. 3. When the second edge node 102 wants to enter the edge computing network, the second edge node 102 includes the install coordinator 206 and the plurality of modules 208. In an embodiment of the present disclosure, the install coordinator 206 acts as an agent to coordinate with the install coordinator 202 of the set of first edge nodes 104. The install coordinator 206 may be a plugin, an API or a patch. The set of first edge nodes 104 implements the following. At step one, the second edge node 102 joins the set of first edge nodes 104. The second edge node 102 may use PxE boot to get an initial image or the PxE boot may be shipped with the initial image. At step two, a boot program is run. The boot program reads the MAC address of the network card. The MAC address is named as MY_MAC_ADDRESS. The boot program starts listening to an installation topic such as say, install, join and the like or the MAC address MY_MAC_ADDRESS. The boot program publishes a message on the installation topic to be agreed upon such as say or install or join, about the second edge node 102, assigning Internet Protocol OP) of the second edge node 102 and the MAC address of the second edge node 102, and the like. At step three, the set of first edge nodes 104 which are on the edge computing network includes the install coordinator 202. The install coordinator 202 listens to the installation topic such as install, join and the like. When the install coordinator 202 receives a message from the second edge node 102, the install coordinator 202 performs verification of the MAC address. The install coordinator 202 checks if the MAC address is valid or not valid. The install coordinator 202 fetches the install instructions for the second edge node 102 in question. The install coordinator 202 starts listening to the installation topic, such as install, or the MAC address MY_MAC_ADDRESS. The install coordinator 202 publishes the install instructions on the installation topic, such as install or on the MAC address MY_MAC_ADDRESS. At step four, the second edge node 102 listens to the installation topic, such as install, or the MAC address MY_MAC_ADDRESS. When the second edge node 102 receives a message, the second edge node 102 executes the install instructions. Once all the instructions are executed, result of the install is published on the installation topic such as install, or the MAC address MY_MAC_ADDRESS. At step five, the install coordinator 202 still listening to the installation topic such as install, or the MAC address MY_MAC_ADDRESS. The results are received and logged centrally. The state of the edge computing network, such as digital twin is updated. The step three to the step five may be performed in loop when booting of the second edge node 102 is required and then strips may be broken into segments.

Figure 3:
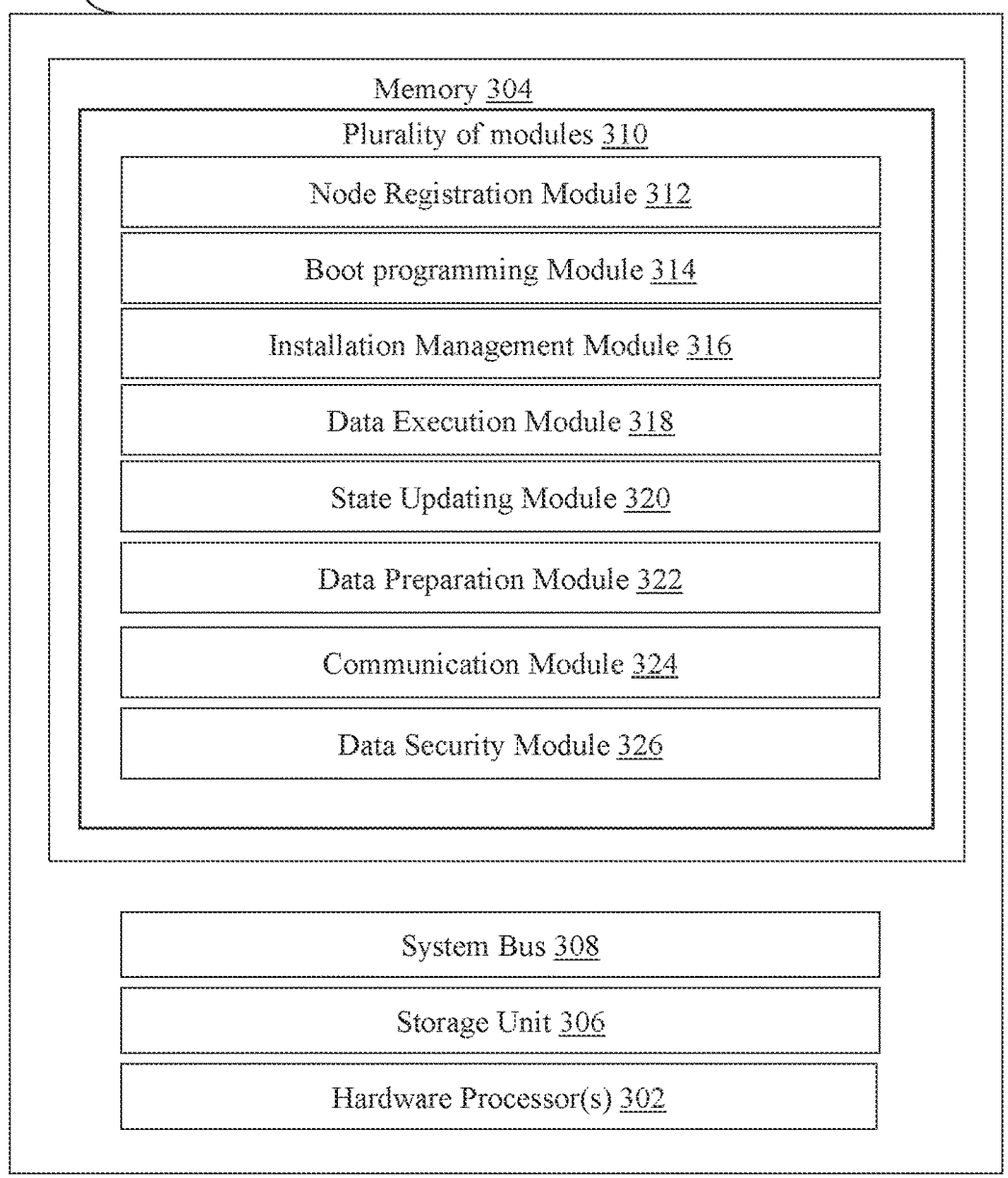
FIG. 3 is a block diagram illustrating an exemplary computing system for facilitating management of edge computing nodes of the edge computing network, in accordance with an embodiment of the present disclosure.

FIG. 3 is a block diagram illustrating an exemplary computing system for facilitating management of edge computing nodes of the edge computing network, in accordance with an embodiment of the present disclosure. In an embodiment of the present disclosure, the computing system corresponds to an edge node of the edge computing network. In an embodiment of the present disclosure, the edge node is configured to automatically configure and update one or more second edge nodes added to the edge computing network. As used herein, the term 'edge node' is a computer that acts as an end user portal for communication with other nodes in Ouster computing. For example, the edge node is a gateway node or edge communication node. Further, the computing system includes one or more hardware processors 302, a memory 304 and a storage unit 306. The one or more hardware processors 302, the memory 304 and the storage unit 306 are communicatively coupled through a system bus 308 or any similar mechanism. The memory 304 comprises the plurality of modules 310 in the form of programmable instructions executable by the one or more hardware processors 302. Further, the plurality of modules 310 includes a node registration module 312, a boot programming module 314, an installation management module 316, a data execution module 318, a state updating module 320, a data preparation module 322, a communication module 324, and a data security module 326.

The one or more hardware processors 302, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 302 may also include embedded controllers, such as generic or programmable logic devices or arrays, application specific integrated circuits, single-chip computers, and the like.

The memory 304 may be non-transitory volatile memory and non-volatile memory. The memory 304 may be coupled for communication with the one or more hardware processors 302, such as being a computer-readable storage medium. The one or more hardware processors 302 may execute machine-readable instructions and/or source code stored in the memory 304. A variety of machine-readable instructions may be stored in and accessed from the memory 304. The memory 304 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 304 includes the plurality of modules 310 stored in the form of machine-readable instructions on any of the above-mentioned storage media and may be in communication with and executed by the one or more hardware processors 302.

In an embodiment of the present disclosure, the storage unit 306 may be a local storage or cloud storage. The storage unit 306 may store the MAC address, the installation topic, one or more parameters, a set of install instructions, a list of valid MAC address and the like. The node registration module 312 is configured to register the one or more second edge nodes with the edge computing network by configuring an initial image in a PxE boot server. The initial image comprises of data that makes up the initial configuration of the bootable disk for the new computer joining the cluster. The data contains the operating system and the boot commands. However, in case a PxE boot server is being used, the initial image is created by installing the boot software (operating system and boot commands) on a machine with a similar hardware configuration. The content of the boot disk is then captured using a disk capture tool. This capture is the image mentioned and the content cloned on to the new computer joining the cluster.

In an embodiment of the present disclosure, the one or more second edge nodes use the PxE boot server to get the initial image. In another embodiment of the present disclosure, the PxE hoot server is shipped with the initial image. Further, the edge computing network includes the set of first edge nodes 104 installed with the edge computing network. In an embodiment of the present disclosure, the one or more second edge nodes are new edge nodes which are not registered with the edge computing network. The set of first edge nodes 104 are edge nodes which are already registered with the edge computing network.

The boot programming module 314 is configured to read a Media Access Control (MAC) address of a network card associated with the one or more second edge nodes by using a boot application upon registering the one or more second edge nodes. In an embodiment of the present disclosure, the boot application corresponds to a boot program. Further, the boot programming module 314 obtains the installation topic and the MAC address upon reading the MAC address. In an embodiment of the present disclosure, the installation topic is the subject of the information that is published in a publish or subscribe messages. Each installation topic comprises of a name. The solution is aware of the name of the installation topic and hence obtains access to the installation topic. This allows it to publish its MAC address as discussed later. Further, the installation topic includes install, join, and the like. The boot programming module 314 publishes a message on the installation topic associated with one or more parameters upon obtaining the installation topic and the MAC address. The message is a set of bytes that follows an agreed-upon format that is sent from a publisher and read by a subscriber. The publisher writes the message on a topic, on the contrary the subscribers gets a copy of the message. The delivery is handled by the messaging system. However, in the present invention it must be noted that the location of the subscriber is not known to the publisher. In order to send the message, the publisher requires to know which topic to publish the message on. In an exemplary embodiment of the present disclosure, the one or more parameters include information associated with the one or more second edge nodes, Internet Protocol (IP) assigned to each of the one or more second edge nodes, MAC address assigned to each of the one or more second edge nodes, and the like. In an embodiment of the present disclosure the installation topic is preconfigured as part of the initial image (held in the boot scripts). The MAC address is accessible from commands issued against the operating system. For example, from a command line interface, the mac address can be obtained by running the command ifconfig-a.

The installation management module 316 is configured to perform one or more operations on the set of first edge nodes 104 based on the installation topic for publishing a set of install instructions on the obtained installation topic and the obtained MAC address upon publishing the message. In performing the one or more operations on the set of first edge nodes 104 based on the installation topic for publishing the set of install instructions on the obtained installation topic and the obtained MAC address upon publishing the message, the installation management module 316 verifies that the MAC address of each of the one or more second edge nodes is valid via the set of first edge nodes 104. The installed nodes correspond to the subscribers of the installation topic, The installed nodes are granted access to a positive list of mac addresses that are valid. Each of the installed nodes can then verify to check the presence of MAC address belonging to a new node in the group.

Further, the installation management module 316 obtains the set of install instructions for the one or more second edge nodes via the set of first edge nodes 104 upon verifying that the MAC address of each of the one or more second edge nodes is valid. The install instructions correspond to a set of commands in order to complete the installation. Any scripting language that is present on the node is considered, however, in the present invention the command line operations available from the operating system are used. In an exemplary embodiment of the present disclosure a simple apt install command such as sudo apt-get install package-name-1 package-name-2 package-name-3 can be considered. Another example could be the running of a more complex interpreter such as the python interpreter can be considered as follows—python installation.py The installation management module 316 obtains the installation topic and the MAC address upon Obtaining the set of install instructions. Furthermore, the installation management module 316 publishes the set of install instructions on the obtained installation topic and the obtained MAC address.

The data execution module 318 is configured to execute the set of install instructions on the one or more second edge nodes upon performing the one or more operations. Further, the data execution module 318 publishes a result of the execution of the set of install instructions on the installation topic and the MAC address. In an embodiment of the present disclosure, the result of the execution is logged centrally.

The state updating module 320 is configured to update a state of the edge computing network upon publication of the result of the execution. In an exemplary embodiment of the present disclosure, updating the state of edge computing network includes replacing one or more first edge nodes of the edge computing network with the one or more second edge nodes, removing the one or more first edge nodes of the edge computing network, adding the one or more second edge nodes to the edge computing network or the like. For example, the replacement installation is performed when either an edge node is required to be upgraded or the edge node is required to be replaced due to failure. The install coordinator shutdowns and removes the first edge node. In an embodiment of the present disclosure, the install coordinator may be a plugin, an API or a patch. In an embodiment of the present disclosure, the install coordinator inserts the second edge node into the network and power on the second edge node. When updating the state of the edge computing network corresponds to replacing the one or more first edge nodes of the edge computing network with the one or more second edge nodes, the one or more second edge nodes restore all state information of the one or more second edge nodes to be replaced by performing one or more restoration operations. In an exemplary embodiment of the present disclosure, the one or more restoration operations include hooking up to a cluster directory that is backed up, running one or more restoration processes in case the data is left corrupt, and the like. In the embodiment of the present disclosure the one or more restoration processes can be applied to the one or more nodes. Especially, when the one or more nodes require to communicate with a set of physical sensors. A node configuration is unique to each of the one or more nodes. The present invention ensures that the node configuration is backed up on at least one of the one or more nodes. Additionally, the configurable one or more nodes can be known through a replication count. In case the one or more nodes undergo failure each of the one or more nodes are changed. The new node added to the one or more nodes then obtains the node configuration from the backed up one or more nodes, required to communicate with the set of physical sensors.

In another embodiment of the present disclosure, the state of edge computing network corresponds to the network, edge nodes and connections inclusive of the software running on each of the nodes. In the first scenario the state of edge computing network can be considered as expanding on addition of one or more nodes. In the second scenario, the state of edge computing network is reduced by one or more nodes. In the third scenario the software running on the one or more nodes requires to be updated or replaced. Often the one or more nodes fail creating a need to replace the failed node with a new node. The aforementioned scenario is an example of a change reduction method followed by an expansion. The present invention facilitates the changing of the one or more nodes undergoing failure without the use of a central controller.

In an embodiment of the present disclosure, the data preparation module 322 registers the MAC address of the one or more second edge nodes shipped as valid nodes. In an embodiment of the present disclosure, the one or more second edge nodes are dedicated to a site or not dedicated the site. Wherein the site corresponds to a location or the role of the one or more nodes, the one or more edge nodes obtain a local responsibility based on their respective location of installation. Further, the data preparation module 322 determines if the one or more second edge nodes are dedicated to the site. The data preparation module 322 detects the site of each of the one or more second edge nodes by using a site identifier via an install coordinator upon determining that the one or more second edge nodes are not dedicated to the site. In an exemplary embodiment of the present disclosure, the site identifier corresponds to a Quick Response (QR) code or Global Positioning System (GPS). In an embodiment of the present disclosure, the QR code is placed at the site. For example, the install coordinator is prompted to scan or enter the site identifier when a new machine joins the installation cluster.

The communication module 324 is configured to perform one or more communication operations. In an exemplary embodiment of the present disclosure, the one or more communication operations include collecting messages from the set of first edge nodes 104 and the one or more second edge nodes, exchanging messages between the set of first edge nodes 104 and the one or more second edge nodes, coordinating with the set of first edge nodes 104 and the one or more second edge nodes, and the like.

In an embodiment of the present disclosure, the data security module 326 initiates the install coordinator with a list of a set of valid MAC addresses, a secret private key for decrypting incoming data, and a public key for the secret private key held by the one or more second edge nodes. The install coordinator is a set of machines that are currently a part of a cluster involved in the creation of the new node. There exist different methods to configure the installation logic. The cluster can either be configured to have one or more dedicated install controllers or each of the one or more nodes priorly installed can take on the role of an install coordinator. The install coordinator corresponds to a software module that registers the installation topic and takes on the job of completing the installation of the new node by validating the new node, providing commands to run, to finish the installation and the like.

Further, the data security module 326 loads the public key of the install coordinator onto the one or more second edge nodes for which the secret private key is known to one or more first edge nodes or the one or more edge nodes that are configured to run the install coordinator. The data security module 326 encrypts a join message with the public key where the payload comprises the MAC address upon loading the public key. The join message corresponds to a message issued on the installation topic when each of the one or more nodes boots for the first time. Additionally, the join message can be referred to a request to the new node to join the cluster. Furthermore, the data security module 326 decrypts the MAC address with the secret private key by using the install coordinator upon encrypting the join message. In an embodiment of the present disclosure, a user with the secret private key is allowed to decrypt the ILIAC address. Thus, the user is protected from invalid installers as only someone with the private key can decrypt the MAC address. The data security module 326 encrypts the set of install instructions with the public key for the one or more second edge nodes having the secret private key. In an embodiment of the present disclosure, the one or more second edge nodes decrypt an install script with their public key. Thus, the user can be protected from wiretaps as well. In an embodiment of the present disclosure the new node is provided with instructions regarding joining the cluster through the install script. An install script is a set of instructions in the form of text that is interpreted by the command line interface of the new node.

Figure 4:
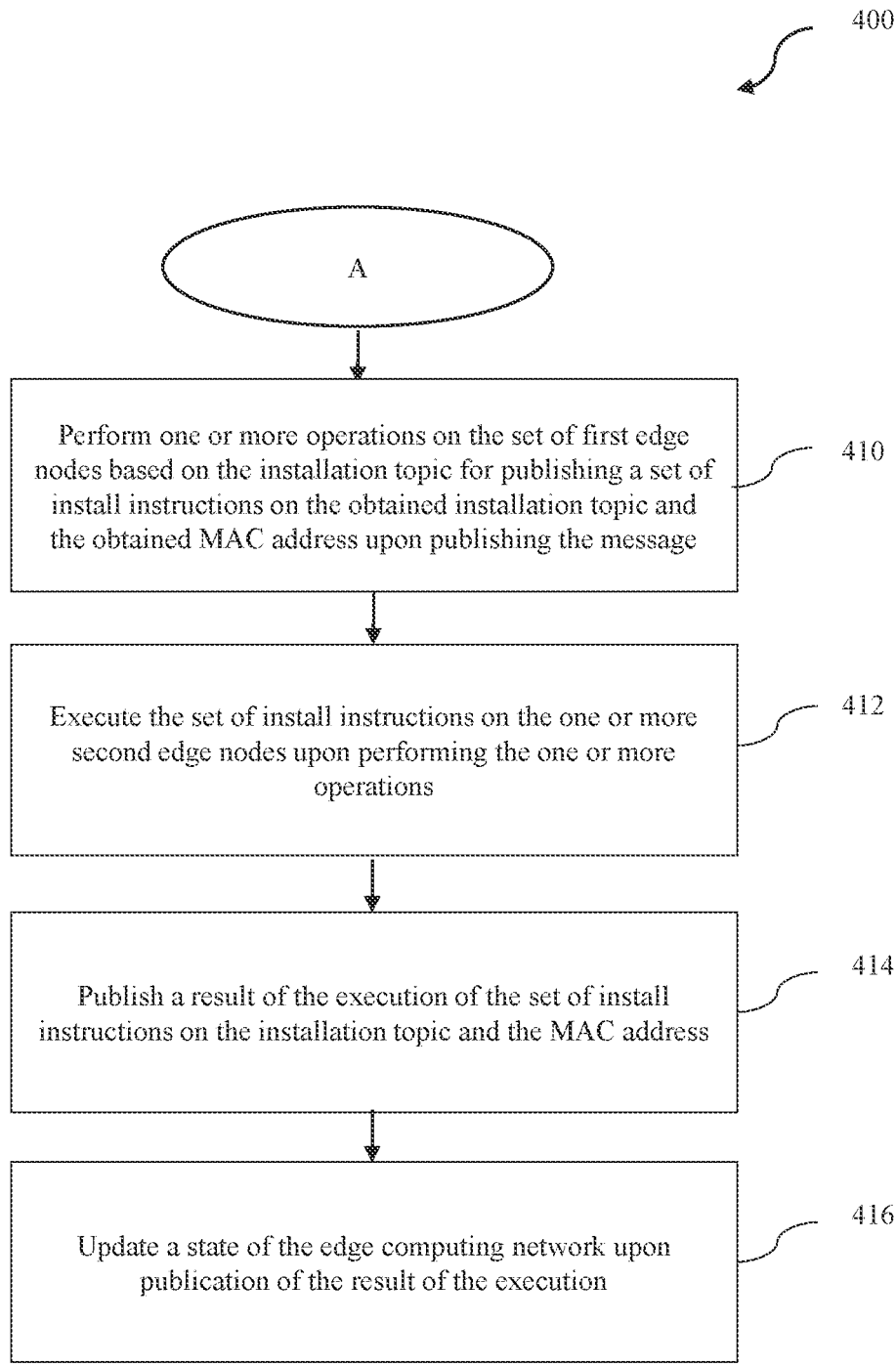
FIG. 4 is a process flow diagram illustrating an exemplary method for facilitating management of edge computing nodes of the edge computing network, in accordance with an embodiment of the present disclosure.

FIG. 4 is a process flow diagram illustrating an exemplary method for facilitating management of edge computing nodes of the edge computing network, in accordance with an embodiment of the present disclosure. In an embodiment of the present disclosure, the method is performed by an edge node of an edge computing network. In an embodiment of the present disclosure, the edge node is configured to automatically configure and update one or more second edge nodes added to the edge computing network. At step 402, the one or more second edge nodes are registered with the edge computing network by configuring an initial image in a PxE boot server. In an embodiment of the present disclosure, the one or more second edge nodes use the PxE boot server to get the initial image. In another embodiment of the present disclosure, the PxE boot server is shipped with the initial image. Further, the edge computing network includes a set of first edge nodes 104 installed with the edge computing network. In an embodiment of the present disclosure, the one or more second edge nodes are new edge nodes which are not registered with the edge computing network. The set of first edge nodes 104 are edge nodes which are already registered with the edge computing network.

At step 404, a Media Access Control (MAC) address of a network card associated with the one or more second edge nodes is read by using a boot application upon registering the one or more second edge nodes. In an embodiment of the present disclosure, the boot application corresponds to a boot program.

At step 406, the installation topic and the MAC address are obtained upon reading the MAC address. In an embodiment of the present disclosure, the installation topic includes install, join, and the like.

At step 408, a message is published on the installation topic associated with one or more parameters upon obtaining the installation topic and the MAC address. In an exemplary embodiment of the present disclosure, the one or more parameters include information associated with the one or more second edge nodes, Internet Protocol (H) assigned to each of the one or more second edge nodes, MAC address assigned to each of the one or more second edge nodes, and the like.

At step 410, one or more operations are performed on the set of first edge nodes 104 based on the installation topic for publishing a set of install instructions on the obtained installation topic and the obtained MAC address upon publishing the message. In performing the one or more operations on the set of first edge nodes 104 based on the installation topic for publishing the set of install instructions on the obtained installation topic and the obtained MAC address upon publishing the message, the method 400 includes verifying that the MAC address of each of the one or more second edge nodes is valid via the set of first edge nodes 104. Further, the method 400 includes obtaining the set of install instructions for the one or more second edge nodes via the set of first edge nodes 104 upon verifying that the MAC address of each of the one or more second edge nodes is valid. The method 400 includes obtaining the installation topic and the MAC address upon obtaining the set of install instructions. Furthermore, the method 400 includes publishing the set of install instructions on the obtained installation topic and the Obtained MAC address.

At step 412, the set of install instructions are executed on the one or more second edge nodes upon performing the one or more operations.

At step 414, a result of the execution of the set of install instructions is published on the installation topic and the MAC address. In an embodiment of the present disclosure, the result of the execution is logged centrally.

At step 416, a state of the edge computing network is updated upon publication of the result of the execution. In an exemplary embodiment of the present disclosure, updating the state of edge computing network includes replacing one or more first edge nodes of the edge computing network with the one or more second edge nodes, removing the one or more first edge nodes of the edge computing network, adding the one or more second edge nodes to the edge computing network or the like. For example, the replacement installation is performed when either an edge node is required to be upgraded or the edge node is required to be replaced due to failure. The install coordinator shutdowns and removes the first edge node. In an embodiment of the present disclosure, the install coordinator inserts the second edge node into the network and power on the second edge node. When updating the state of the edge computing network corresponds to replacing the one or more first edge nodes of the edge computing network with the one or more second edge nodes, the one or more second edge nodes restore all state information of the one or more second edge nodes to be replaced by performing one or more restoration operations. In an exemplary embodiment of the present disclosure, the one or more restoration operations include hooking up to a Ouster directory that is backed up, running one or more restoration processes in case the data is left corrupt, and the like.

In an embodiment of the present disclosure, the method 400 includes registering the MAC address of the one or more second edge nodes shipped as valid nodes. In an embodiment of the present disclosure, the one or more second edge nodes are dedicated to a site or not dedicated the site. Further, the method 400 includes determining if the one or more second edge nodes are dedicated to the site. The method 400 includes detecting the site of each of the one or more second edge nodes by using a site identifier via an install coordinator upon determining that the one or more second edge nodes are not dedicated to the site. In an exemplary embodiment of the present disclosure, the site identifier corresponds to a Quick Response (QR) code or Global Positioning System (GPS). In an embodiment of the present disclosure, the QR code is placed at the site. For example, the install coordinator is prompted to scan or enter the site identifier when a new machine joins the installation Ouster.

The method 400 includes performing one or more communication operations. In an exemplary embodiment of the present disclosure, the one or more communication operations include collecting messages from the set of first edge nodes 104 and the one or more second edge nodes, exchanging messages between the set of first edge nodes 104 and the one or more second edge nodes, coordinating with the set of first edge nodes 104 and the one or more second edge nodes, and the like.

In an embodiment of the present disclosure, the method 400 includes initiating the install coordinator with a list of a set of valid MAC addresses, a secret private key for decrypting incoming data, and a public key for the secret private key held by the one or more second edge nodes. Further, the method 400 includes loading the public key of the install coordinator onto the one or more second edge nodes for which the secret private key is known to one or more first edge nodes or the one or more edge nodes that are configured to run the install coordinator. The method 400 includes encrypting a join message with the public key where the payload comprises the MAC address upon loading the public key. Furthermore, the method 400 includes decrypting the MAC address with the secret private key by using the install coordinator upon encrypting the join message. In an embodiment of the present disclosure, a user with the secret private key is allowed to decrypt the MAC address. Thus, the user is protected from invalid installers as only someone with the private key can decrypt the MAC address. The method 400 includes encrypting the set of install instructions with the public key for the one or more second edge nodes having the secret private key. In an embodiment of the present disclosure, the one or more second edge nodes decrypt an The AI-based method 400 may be implemented in any suitable hardware, software, firmware, or combination thereof.

Thus, various embodiments of the present system provide a solution to facilitate management of edge computing nodes of an edge computing network. The computing system ensures that the second edge node 102 has a human readable hostname when installing the new edge node 102. This human readable hostname has to be obtained from some central server. Further, the present disclosure has developed a procedure where the centrally controlled software is triggered by the install coordinator. The service technician connects the second edge node 102 to the edge computing network, such that the second edge node 102 learns its role in the set of first edge nodes 104. The edge nodes can be replaced if there is an occurrence of failures. The swarm installer includes an installation process as simple as disconnecting broken edge node and replacing it with the new edge node. The installation process includes preparation, new installation, and replacement installation.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and MD.

Input/output (110) devices (including but not limited to keyboards, displays, pointing devices, etc.) can be coupled to the system either directly or through intervening I/O. Network adapters may also be coupled to the system to enable the data processing system to become coupled to other data processing systems or remote printers or storage devices through intervening private or public networks Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 308 to various devices such as a random-access memory (RAM), read-only memory (ROM), and an input/output (110) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description, Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

I claim:

1. A computing system for facilitating management of edge computing nodes of an edge computing network, the computing system comprising: one or more hardware processors; and a memory coupled to the one or more hardware processors, wherein the memory comprises a plurality of modules in the form of programmable instructions executable by the one or more hardware processors, and wherein the plurality of modules comprises: a node registration module configured to register one or more second edge nodes with an edge computing network by configuring an initial image in a Preboot Execution Environment (PxE) boot server, wherein the edge computing network comprises a set of first edge nodes installed with the edge computing network, wherein the one or more second edge nodes are new edge nodes which are not registered with the edge computing network, and wherein the set of first edge nodes are edge nodes which are already registered with the edge computing network; a boot programming module configured to: read a Media Access Control (MAC) address of a network card associated with the one or more second edge nodes by using a boot application upon registering the one or more second edge nodes; obtain an installation topic and the MAC address upon reading the MAC address, wherein the installation topic comprises install and join; and publish a message on the installation topic associated with one or more parameters upon obtaining the installation topic and the MAC address; an installation management module configured to perform one or more operations on the set of first edge nodes based on the installation topic for publishing a set of install instructions on the obtained installation topic and the obtained MAC address upon publishing the message; a data execution module configured to: execute the set of install instructions on the one or more second edge nodes upon performing the one or more operations; and publish a result of the execution of the set of install instructions on the installation topic and the MAC address, wherein the result of the execution is logged centrally; and a state updating module configured to update a state of the edge computing network upon publication of the result of the execution, wherein updating the state of edge computing network comprise one of: replacing one or more first edge nodes of the edge computing network with the one or more second edge nodes, removing the one or more first edge nodes of the edge computing network and adding the one or more second edge nodes to the edge computing network.

2. The computing system of claim 1, wherein the one or more parameters comprise information associated with the one or more second edge nodes, Internet Protocol (IP) assigned to each of the one or more second edge nodes and MAC address assigned to each of the one or more second edge nodes.

3. The computing system of claim 1, wherein in performing the one or more operations on the set of first edge nodes based on the installation topic for publishing the set of install instructions on the obtained installation topic and the obtained MAC address upon publishing the message, the installation management module is configured to:
verify that the MAC address of each of the one or more second edge nodes is valid via the set of first edge nodes;
obtain the set of install instructions for the one or more second edge nodes via the set of first edge nodes upon verifying that the MAC address of each of the one or more second edge nodes is valid;
obtain the installation topic and the MAC address upon obtaining the set of install instructions; and
publish the set of install instructions on the obtained installation topic and the obtained MAC address.

4. The computing system of claim 1, further comprising a communication module configured to perform one or more communication operations, wherein the one or more communication operations comprise collecting messages from the set of first edge nodes and the one or more second edge nodes, exchanging messages between the set of first edge nodes and the one or more second edge nodes, and coordinating with the set of first edge nodes and the one or more second edge nodes.

5. The computing system of claim 1, further comprising a data preparation module configured to:

register the MAC address of the one or more second edge nodes shipped as valid nodes, wherein the one or more second edge nodes are one of: dedicated to a site and not dedicated the site;
determine if the one or more second edge nodes are dedicated to the site; and
detect the site of each of the one or more second edge nodes by using a site identifier via an install coordinator upon determining that the one or more second edge nodes are not dedicated to the site, wherein the site identifier corresponds to one of: Quick Response (QR) code and Global Positioning System (GPS).

6. The computing system of claim 1, wherein the computing system corresponds to a first edge node of the edge computing network, and wherein the first edge node is configured to automatically configure and update the one or more second edge nodes added to the edge computing network.

7. The computing system of claim 1, wherein when updating the state of the edge computing network corresponds to replacing the one or more first edge nodes of the edge computing network with the one or more second edge nodes, the one or more second edge nodes restore all state information of the one or more second edge nodes to be replaced by performing one or more restoration operations, and wherein the one or more restoration operation comprise hooking up to a cluster directory that is backed up and running one or more restoration processes in case the data is left corrupt.

8. The computing system of claim 1, further comprising a data security module configured to:
initiate an install coordinator with a list of a set of valid MAC addresses, a secret private key for decrypting incoming data, and a public key for the secret private key held by the one or more second edge nodes;
load the public key of the install coordinator onto the one or more second edge nodes for which the secret private key is known to one of: one or more first edge nodes and the one or more edge nodes that are configured to run the install coordinator;
encrypt a join message with the public key where the payload comprises the MAC address upon loading the public key;
decrypt the MAC address with the secret private key by using the install coordinator upon encrypting the join message, wherein a user with the secret private key is allowed to decrypt the MAC address; and
encrypt the set of install instructions with the public key for the one or more second edge nodes having the secret private key, wherein the one or more second edge nodes decrypt an install script with their public key.

9. The computing system of claim 1, wherein the one or more second edge nodes use the PxE boot server to get the initial image, and wherein the PxE boot server is shipped with the initial image.

10. A method for facilitating management of edge computing nodes of an edge computing network, the method comprising:
registering, by one or more hardware processors, one or more second edge nodes with an edge computing network by configuring an initial image in a PxE boot server, wherein the edge computing network comprises a set of first edge nodes installed with the edge computing network, wherein the one or more second edge nodes are new edge nodes which are not registered with the edge computing network, and wherein the set of first edge nodes are edge nodes which are already registered with the edge computing network;

reading, by the one or more hardware processors, a Media Access Control (MAC) address of a network card associated with the one or more second edge nodes by using a boot application upon registering the one or more second edge nodes;

obtaining, by the one or more hardware processors, an installation topic and the MAC address upon reading the MAC address, wherein the installation topic comprises install and join;

publishing, by the one or more hardware processors, a message on the installation topic associated with one or more parameters upon obtaining the installation topic and the MAC address;

performing, by the one or more hardware processors, one or more operations on the set of first edge nodes based on the installation topic for publishing a set of install instructions on the obtained installation topic and the obtained MAC address upon publishing the message;

executing, by the one or more hardware processors, the set of install instructions on the one or more second edge nodes upon performing the one or more operations;

publishing, by the one or more hardware processors, a result of the execution of the set of install instructions on the installation topic and the MAC address, wherein the result of the execution is logged centrally; and updating, by the one or more hardware processors, a state of the edge computing network upon publication of the result of the execution, wherein updating the state of edge computing network comprise one of: replacing one or more first edge nodes of the edge computing network with the one or more second edge nodes, removing the one or more first edge nodes of the edge computing network and adding the one or more second edge nodes to the edge computing network.

11. The method of claim 10, wherein the one or more parameters comprise information associated with the one or more second edge nodes, Internet Protocol (IP) assigned to each of the one or more second edge nodes and MAC address assigned to each of the one or more second edge nodes.

12. The method of claim 10, wherein performing the one or more operations on the set of first edge nodes based on the installation topic for publishing the set of install instructions on the obtained installation topic and the obtained MAC address upon publishing the message comprises:
verifying that the MAC address of each of the one or more second edge nodes is valid via the set of first edge nodes;
obtaining the set of install instructions for the one or more second edge nodes via the set of first edge nodes upon verifying that the MAC address of each of the one or more second edge nodes is valid;
obtaining the installation topic and the MAC address upon obtaining the set of install instructions; and
publishing the set of install instructions on the obtained installation topic and the obtained MAC address.

13. The method of claim 10, further comprising performing one or more communication operations, wherein the one or more communication operations comprise collecting messages from the set of first edge nodes and the one or more second edge nodes, exchanging messages between the set of first edge nodes and the one or more second edge nodes, and coordinating with the set of first edge nodes and the one or more second edge nodes.

14. The method of claim 10, further comprising:
registering the MAC address of the one or more second edge nodes shipped as valid nodes, wherein the one or more second edge nodes are one of: dedicated to a site and not dedicated the site;
determining if the one or more second edge nodes are dedicated to the site; and
detecting the site of each of the one or more second edge nodes by using a site identifier via an install coordinator upon determining that the one or more second edge nodes are not dedicated to the site, wherein the site identifier corresponds to one of: Quick Response (QR) code and Global Positioning System (GPS).

15. The method of claim 10, wherein the method is performed by a first edge node of the edge computing network, and wherein the first edge node is configured to automatically configure and update the one or more second edge nodes added to the edge computing network.

16. The method of claim 10, wherein when updating the state of the edge computing network corresponds to replacing the one or more first edge nodes of the edge computing network with the one or more second edge nodes, the one or more second edge nodes restore all state information of the one or more second edge nodes to be replaced by performing one or more restoration operations, and wherein the one or more restoration operation comprise hooking up to a cluster directory that is backed up and running one or more restoration processes in case the data is left corrupt.

17. The method of claim 10, further comprising:
initiating an install coordinator with a list of a set of valid MAC addresses, a secret private key for decrypting incoming data, and a public key for the secret private key held by the one or more second edge nodes;
loading the public key of the install coordinator onto the one or more second edge nodes for which the secret private key is known to one of: one or more first edge nodes and the one or more edge nodes that are configured to run the install coordinator;
encrypting a join message with the public key where the payload comprises the MAC address upon loading the public key;
decrypting the MAC address with the secret private key by using the install coordinator upon encrypting the join message, wherein a user with the secret private key is allowed to decrypt the MAC address; and
encrypting the set of install instructions with the public key for the one or more second edge nodes having the secret private key, wherein the one or more second edge nodes decrypt an install script with their public key.

18. The method of claim 10, wherein the one or more second edge nodes use the PxE boot server to get the initial image, and wherein the PxE boot server is shipped with the initial image.

* * * * *